United States Patent [19]

Shutt

[11] Patent Number: 4,461,143

[45] Date of Patent: Jul. 24, 1984

[54] ON-BOARD AIRCRAFT ENGINE STARTING APPARATUS

[75] Inventor: Donald P. Shutt, Long Beach, Calif.

[73] Assignee: Western Gear Corporation, Lynwood, Calif.

[21] Appl. No.: 245,136

[22] Filed: Mar. 18, 1981

[51] Int. Cl.³ .......................... F02C 7/26; F02G 3/00
[52] U.S. Cl. ................................. 60/39.142; 60/39.33
[58] Field of Search ............ 60/39.14 M, 35.15, 39.07, 60/39.15, 39.33; 123/179 R, 179 J, 179 AS, 179 D; 74/7 C, 6, 7 R, 7 E

[56] References Cited

U.S. PATENT DOCUMENTS

| | | | |
|---|---|---|---|
| 2,838,913 | 6/1958 | Peterson | 60/39.14 M |
| 2,939,324 | 6/1960 | Gilbert et al. | 74/7 C |
| 3,290,963 | 12/1966 | Oldfield et al. | 60/39.14 M |
| 3,485,041 | 12/1969 | Evans | 60/39.14 M |
| 3,982,618 | 9/1976 | Horsch | 192/113 B |
| 3,983,693 | 10/1976 | Werner | 123/179 AS |
| 4,291,794 | 9/1981 | Bauer | 192/113 B |

Primary Examiner—Louis J. Casaregola
Assistant Examiner—Timothy S. Thorpe
Attorney, Agent, or Firm—Pretty, Schroeder, Brueggemann & Clark

[57] ABSTRACT

A starting power source is connected to a jet engine of an aircraft by alternative drive trains having different mechanical advantages, each associated with a clutch. The clutches are centrally supplied with cooling fluid and the discs and plates of the clutches are grooved to promote outward migration of the fluid resulting in a thin shear film of fluid on the opposing clutch surfaces to permit a soft, gradual engagement. It is possible to start the engine with only a single shift which occurs after the ignition point has been reached and during the assist phase of the starting procedure. The invention can be applied to aircraft having more than one engine.

4 Claims, 6 Drawing Figures

ON-BOARD AIRCRAFT ENGINE STARTING APPARATUS

FIELD OF THE INVENTION

The present invention relates to aircraft, and more particularly to on-board aircraft engine starting apparatus and to a method of operating such apparatus.

BACKGROUND OF THE INVENTION

A jet aircraft is often provided with an on-board auxiliary power unit (APU), a small gas turbine engine one function of which is to provide starting power for the main engine or engines. The auxiliary power unit is also used to operate various aircraft components via the hydraulic and electrical systems while the aircraft is grounded, usually for testing purposes. When in the testing mode, the auxiliary power unit must be mechanically disconnected from the engine or engines.

Some aircraft employ air turbine starters (ATS) operated by on-board compressors, but in that case the compressor motor is often used in the same way as an auxiliary power unit to operate the hydraulic and electrical systems for testing purposes. It too must be disconnected from the engine.

A critical aspect of the design of many military aircraft relates to the time required to change from the test mode to the fully operational mode in which the auxiliary power unit can be used to start the engines. If the re-connect time is too long, the aircraft must be considered non-operational and unable to respond to an attack. In some geographic areas, the re-connect time must be measured in seconds.

The solution to this reconnect problem relied upon to date has been the use of a torque converter associated with each engine. In a two engine configuration, the auxiliary power unit drives the first engine through the corresponding torque converter until it is started and then the first engine drives the second through a cross-drive and its torque converter until it starts. There have, however, been significant problems associated with the use of torque converters for this purpose, and a superior engine starting apparatus and method has been sought.

Some important problems associated with the use of torque converters relate to the high sensitivity of the converters to temperature changes. When the temperature is low, for example, the converter fluid becomes excessively viscous and the resulting high torque can cause shafts and other components to fail. Moreover, the viscous fluid sometimes will not flow through small converter passages important to the operation and control of the device. Other disadvantages to the use of torque converters relate to the fact that they do not provide a linear relationship between speed and torque. In addition there are problems arising from the foaming action of converters when operated in the cavitation mode, as is necessary for cross-drive purposes.

Despite the known disadvantages of torque converters, no satisfactory alternative starting power drive line has been devised. Torque converters alone have had the required capability to mate the engine to the torque/speed curve of the auxiliary power unit over the entire speed range that takes the engine from a rest condition to a point at which it is not only self-sustaining but it is able to accelerate quickly to full power. The torque that must be transmitted to the engine drive shaft is of an order of magnitude of about 150 ft. lbs.

Applicant has considered the replacement of each torque converter by a transmission having a plurality of parallel gear trains and a series of clutches that allow these gear trains to be employed successively. However, the number of separate gear trains required to cover the operating range of the starting apparatus would appear to be excessive, increasing in size, weight and complexity beyond acceptable limits. Moreover, it would prove very difficult if not impossible to shift smoothly between successive gear trains, particularly during the resist phase of the starting procedure.

To reduce the number of separate gear trains would require greater slippage in the clutches. Conventional clutches, either wet or dry, that would be capable of handling the torque loads imposed cannot withstand the necessary slippage and the high energy dissipation requirements. Typically these clutches would have to be fully engaged within less than about one second to avoid burning out.

A primary objective of the present invention is to provide a relatively simple but highly effective starting power drive line for jet aircraft and method of operating the same that overcomes disadvantages of previously known apparatus that employ torque converters. A further objective is to avoid the need for a transmission having a large number of successively available gear ratios and to provide clutches that are capable of handling the high loads and energy dissipation requirements.

SUMMARY OF THE INVENTION

In an aircraft having a jet engine, an apparatus for starting the engine, which accomplishes the above objectives, includes a starting power source, and first and second gear trains for delivering rotational power from the starting power source to the engine at first and second mechanical advantages. The first gear train provides the higher mechanical advantage and no additional gear ratios are required. Clutches are provided for smoothly and selectively connecting either gear train to the engine, the clutches being of a high energy dissipation construction.

Each clutch includes a plurality of interfacing plates and discs arranged in a stack, at least some of which are provided on their opposing surfaces with cooling fluid distribution grooves that extend outwardly from the centers thereof. A provision is made for introducing pressurized cooling fluid to the centers of the plates and discs so that the fluid is caused to continuously migrate radially and outwardly across the opposing clutch surfaces to provide a thin shear film.

A shift means is provided for sensing the speed of the jet engine and for disengaging the first clutch and engaging the second clutch at a predetermined engine speed above the ignition point of the engine that occurs during the assist phase of the starting procedure. Preferably the engagement of a clutch takes place over a period of about ten to twenty seconds.

The grooves on the plate surfaces of a preferred construction form a sun-burst or a wagon-track pattern. Overrun mechanisms can be provided to prevent the transmission of power from the engine to the starting power source.

The invention can be applied to an aircraft having more than one engine. In a two-engine aircraft third and fourth clutches are provided, these clutches having a construction similar to the first and second. A cross-drive mechanism is provided for starting the second engine through the third and fourth clutches.

Other features and advantages of the present invention will become apparent from the following detailed description, taken in conjunction with the accompanying drawings, which illustrate, by way of example, the principles of the invention.

DESCRIPTION OF THE PREFERRED EMBODIMENT

Figure 1:
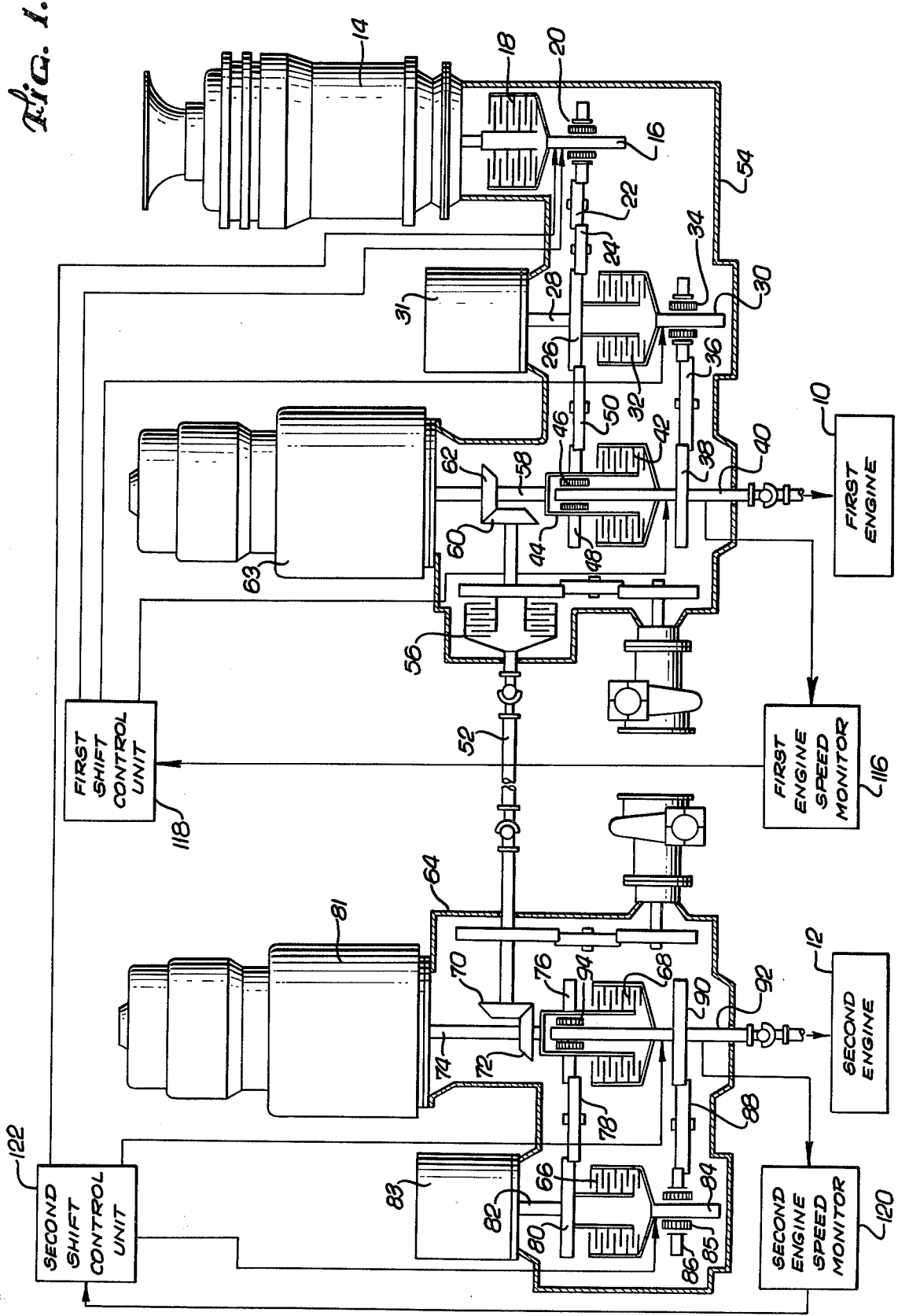
FIG. 1 is a partially schematic representation showing the auxiliary power unit, jet engines and starting power drive lines of an aircraft.
Figure 2:
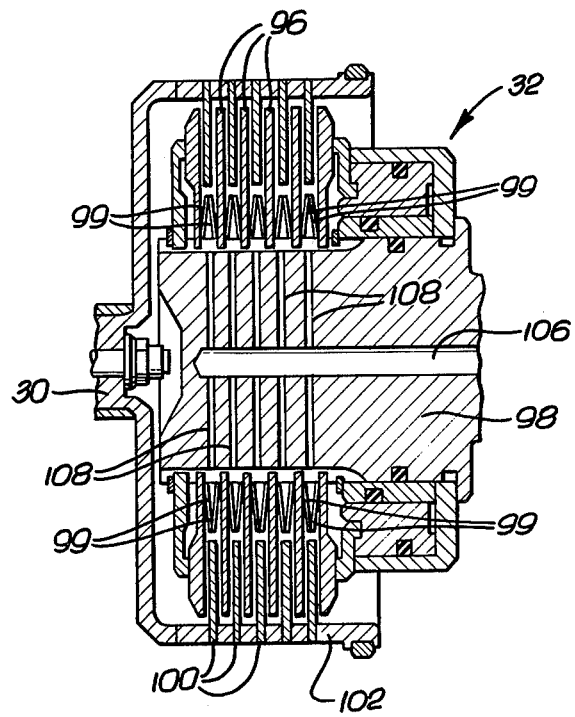
FIG. 2 is a cross-sectional view of a clutch included in the apparatus of FIG. 1.

An apparatus that embodies the present invention, shown in FIGS. 1-4 of the accompanying drawings, includes first and second jet engines 10 and 12 (FIG. 1) and an auxiliary power unit 14 mounted on board an aircraft (not shown). The auxiliary power unit 14 is a relatively small gas turbine engine used to start the jet engines 10 and 12 in a manner explained below. An additional purpose of the auxiliary power unit 14 is to provide power for the hydraulic and electrical systems of the aircraft when the jet engines 10 and 12 are not running. Thus, the auxiliary power unit 14 can energize these systems for testing purposes.

A drive train that supplies starting power from the auxiliary power unit 14 to the first jet engine 10 includes a main output shaft 16 that can be decoupled from the auxiliary power unit by a main clutch 18. From the main output shaft 16, the starting power is supplied, through an overrun mechanism 20, to two idler gears 22 and 24, and then to a first clutch drive gear 26 which is mounted on a first clutch input shaft 28.

Axially aligned with the first clutch input shaft 28 is a first clutch output shaft 30, these shafts being connectible for joint rotation by a first clutch 32 that is described below. On the opposite end of the first clutch input shaft 30 is a hydraulic pump 31 for other aircraft systems (not shown).

The first clutch output shaft 30 is connected by an overrun mechanism 34 to a larger idler gear 36 and thence to an engine input gear 38 mounted on a first engine input shaft 40 by which power can be supplied directly to the first jet engine 10. The first engine input shaft 40 is also the output shaft of a second clutch 42 which has an input side or hub 44 connected by an overrun mechanism 46 and a second clutch drive gear 48 to an idler gear 50, which in turn engages the first clutch drive gear 26.

Two parallel drive trains from the auxiliary power unit 14 to the first jet engine 10 are provided by the arrangement described above. The first drive train, which includes the first clutch 32, has a significantly higher mechanical advantage than the second drive train, which includes the second clutch 42. Thus the first jet engine 10 is to be driven first through the first drive train, with the first clutch 32 engaged and then through the second drive train, with the second clutch 42 engaged.

Power can be supplied to the second jet engine 12 by a cross-over drive shaft 52 that extends from a first housing 54 in which the above-mentioned clutches 18, 32 and 42 are enclosed and on which the auxiliary power unit 14 is mounted. The cross-over drive shaft 52 is driven through a cross-over clutch 56, within the first housing 54, that is in turn driven on the input side from a shaft 58 that forms part of the input side of the second clutch 42 and a pair of bevel gears 60 and 62. On the opposite end of the shaft 58 is an electric generator 63 for other aircraft systems (not shown).

The opposite end of the cross-over drive shaft 52 enters a second housing 64 where it supplies power to a third clutch 66 and a fourth clutch 68. A pair of bevel gears 70 and 72 connect the cross-over drive shaft 52 to a fourth clutch input shaft 74 which is connected through a transfer gear 76, an idler gear 78 and a third clutch drive gear 80 to the input side of the third clutch 66. The shaft 74 also drives a generator 81 that provides redundancy for the generator 63 while the gear 80 is connected by a shaft 82 to a hydraulic pump 83 that provides redundancy for the pump 31.

An output shaft 84 of the third clutch 66 is connected, via an overrunner 85, an output gear 86, an idler gear 88 and an input gear 90 to an input shaft 92 for the second jet engine 12. Another overruner 94 permits the transmission of power from the second engine 12 back through the input shaft 92 to the generator 81. Preferably, all the overrunners 20, 34, 46, 85 and 94 are sprag clutches.

When the third clutch 66 is disengaged and the fourth clutch 68 is engaged, power from the fourth clutch input shaft 74 is supplied to the second engine input shaft 92. Thus there are two drive trains for starting the second engine 12, just as there are for starting the first engine 10. The first gear train, having the greater mechanical advantage, includes the third clutch 66, while the second drive train includes the fourth clutch 68.

Since only two gear ratios are available for each engine 10 and 12, it is imperative that there be a soft engagement of each of the clutches 32, 42, 66 and 68. In an exemplary aircraft with an auxiliary power unit producing about 150 ft./lbs. of torque, each clutch could be expected to remain partially engaged for about ten to twenty seconds, typically about fifteen seconds. This performance requirement is far in excess of the ability of the conventional wet or dry clutches to dissipate energy without burning up. It is, however, surprisingly possible to meet this requirement with clutches of a construction illustrated in FIG. 2. Although the first clutch 32 is shown in that figure, it is representative of the construction of the second, third and fourth clutches 42, 66 and 68, as well as the main clutch 18 and the cross-drive clutch 56.

The first clutch 32 includes a plurality of annular plates 96 laminated on both sides with friction material 97. The plates are attached at their inner peripheries to a central support 98 that forms an extension of the first clutch input shaft 28. Accordingly the plates 96 must rotate with the support 98.

Interleaved between the plates 96 are thin, flat annular discs 100, arranged to form a stack of alternating plates and discs. Adjacent plates 96 and discs 100 are normally separated by springs 99 when the clutch 32 is not engaged, thus insuring uniform engagement and disengagement throughout the length of the clutch. The springs 99 are conical, annular members that are arranged in opposing pairs. Other spring configurations, such as wave springs, can also be used. Each disc 100 is connected at its outer periphery to a collar 102 that is in turn connected to the first clutch output shaft 30 for rotation therewith. The discs 100 are plain steel members that are not laminated with friction material. When the clutch 32 is to be engaged, an actuator 103 causes the plates 96 and discs 100 to be pressed together axially.

Figure 3:
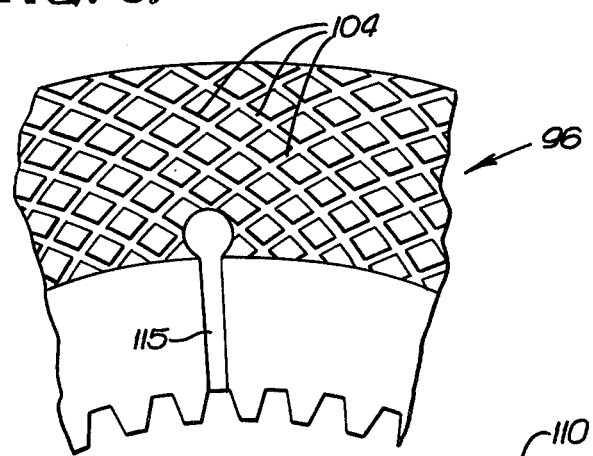
FIG. 3 is a fragmentary plan view of a plate of the clutch of FIG. 2.
Figure 4:
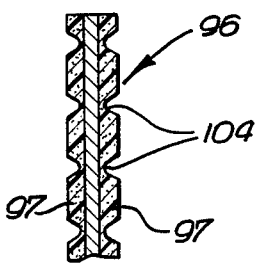
FIG. 4 is a cross-sectional view of the plate taken along the line 3—3 of FIG. 2.

The engagement surfaces of the plates 96 and discs 100 define grooves 104, as shown in FIGS. 3 and 4, that carry pressurized cooling fluid such as turbine oil. Pressurized fluid is supplied to the grooves 104 by a central oil passage 106 that extends axially through the central structure 98 and a plurality of radially extending branch passages 108 by which the central passage is ported to the inner peripheries of the plates 96 and discs 100. An exemplary oil pressure of about 20 to 40 p.s.i. would typically be sufficient.

The grooves 104 should extend outwardly from the center of the clutch 32 to assist the cooling fluid in migrating across the opposing surfaces of the plates 96 and discs 100 with passages formed by the grooves and opposing disc surfaces 104 when the plates and discs engage each other. Preferably, the grooves 104 should not be arranged in a spoke-like radial pattern since the fluid would then tend to flow along the grooves and would have less tendency to coat the opposing clutch surfaces.

A preferred groove pattern, best shown in FIG. 3, is a sun-burst pattern in which the grooves 104 have a large circumferential component as well as a radial component. Each groove 104 is an arc of a circle having a center off-set from that of the plate 96. This pattern provides a relatively long path for the fluid that promotes controlled migration of the fluid out of the grooves 104 onto the opposing plate and disc surfaces. In addition, the long travel time of the fluid enhances its ability to absorb heat energy from the plate and disc surfaces.

Figure 5:
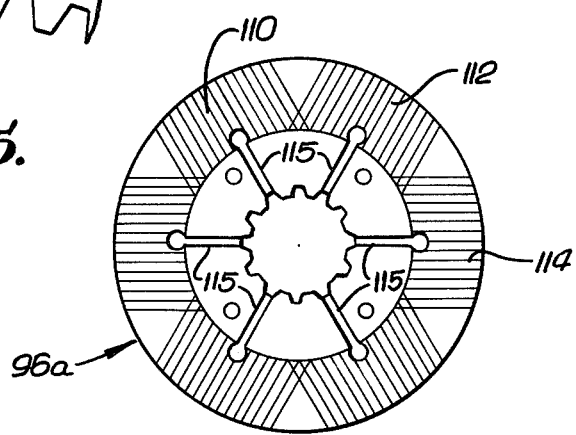
FIG. 5 is a plan view of a clutch plate of an alternative construction.

An alternative groove configuration, shown in FIG. 5, forms a "wagon-track" pattern on a plate 96a. This pattern employs three sets 110, 112 and 114 of grooves. Each set is made up of a plurality of straight, parallel grooves, the set extending diametrically across each plate 96a. An angle of 120 degrees is formed between adjacent sets. Although this illustrative wagon-track pattern employs three sets of grooves 110, 112 and 114, fewer or more sets can be used if desired. In general, wagon-track patterns are slightly less effective than sun-burst patterns but are more readily fabricated.

Whatever groove pattern is chosen, the objective is to keep the entire surface of each plate 96 and disc 100 covered with a thin shear film of cooling fluid for the duration of the engagement or disengagement of the clutch 32. The fluid can move radially outwardly past the springs 99 into the groove pattern through keyhole-shaped slots 115 that extend from the center of each plate 96. The supply of cooling fluid to the center of the clutch 32 and the provision of grooves 104 or 110, 112 and 114 to promote controlled outward migration of the fluid is essential. A properly designed groove pattern will permit the clutch to slip continuously, provided that the oil is cooled to the proper temperature prior to recirculation. Accordingly, the clutches could be referred to as having a continuous slip capability.

Operation of the apparatus will now be described and the structure of the clutches 32, 44, 66 and 68 will be explained further in that context. In this exemplary starting procedure, the auxiliary power unit 14 is to be used to start the first engine 10. Thus the main clutch 18 is engaged, after starting the auxiliary power unit 14, and the cross-drive clutch 56 is disengaged. Initially the first clutch 32 is engaged and the second clutch 42 is disengaged to provide the maximum mechanical advantage when starting the first engine 10.

Figure 6:
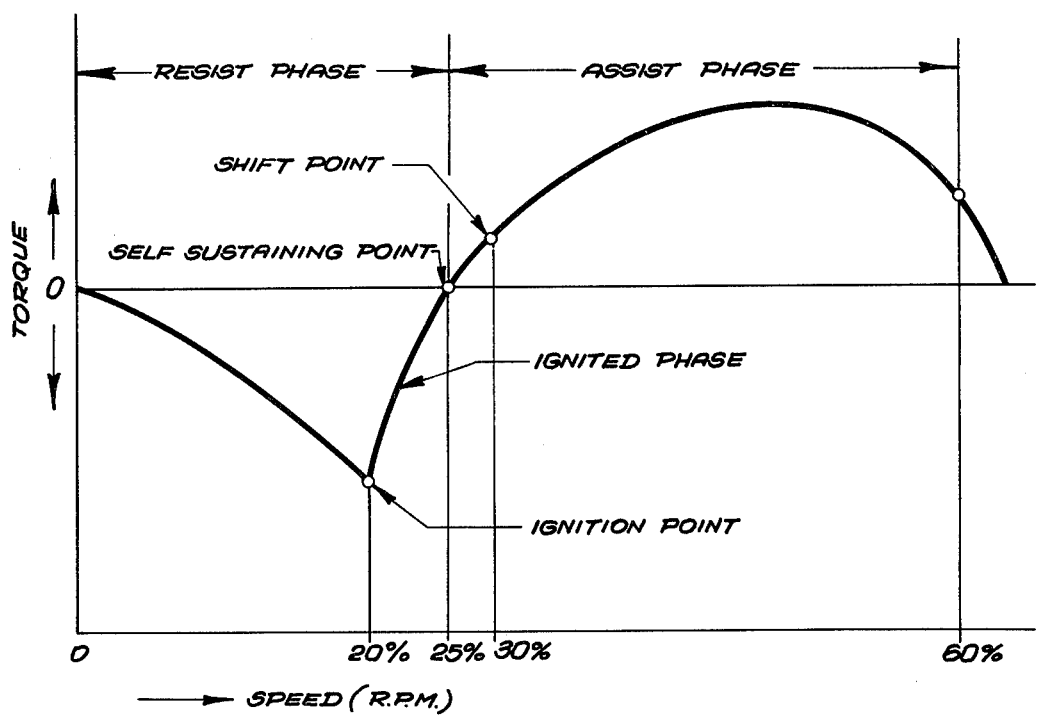
FIG. 6 is a graphic illustration of the starting procedure applicable to the apparatus of FIG. 1.

The interaction between the first engine 10 and the auxiliary power unit 14 is best understood with reference to the graph of FIG. 6. As the speed at which the auxiliary power unit 14 that drives the engine 10 increases, the required torque also increases due to the resistance attributable to engine compression. Typically, engine ignition takes place at about 20 percent of engine speed, and it is at the ignition point that maximum starting torque at the engine (about 150 ft. lb.) is required.

Once ignition takes place, the input torque requirement falls rapidly, but the engine 10 is not at once self-sustaining. Therefore, the engine 10 is still in the "resist" phase and the auxiliary power unit 14 must continue to supply torque to maintain combustion.

At about 25 percent of engine speed, the engine 10 becomes theoretically self-sustaining and the engine 10 begins to work with the auxiliary power unit 14. However, the auxiliary power unit 14 continues to apply torque to the engine 10 to increase engine speed as rapidly as possible.

Eventually the shift point is reached; the first clutch 32 is to be disengaged and the second clutch 42 is to be engaged. The engine speed is sensed electronically by a first engine speed monitor 116 which supplies a signal representing the engine speed to a control unit 118. When the control unit 118 determines that the preselected shift point has arrived, it produces output signals that cause the first clutch 32 to be disengaged. The engine 10 is then driven to higher speeds by the auxiliary power unit 14 with the benefit of a higher gear ratio (a lower mechanical advantage) through the second clutch 42.

It is important that the shift point occur during the assist phase of the start, typically at slightly less than 30 percent of engine speed. Not only does this insure a smoother shift, but it provides a safety factor in the event of a failure of the second clutch 42. The engine 10, being in the assist phase at the shift point, could fully start without further power input from the auxiliary power unit 14, although this procedure would take longer.

It should be noted that disengagement of the first clutch 32 is not instantaneous. Accordingly, the second clutch 42 may begin to engage before the first clutch 32 is fully disengaged. However, damage to the clutches 32 and 42 is avoided by the overrun mechanism 34 associated with the first clutch 32 which assures that power cannot be transmitted from the engine 10 back through the first clutch output shaft 30.

It is particularly important to avoid a situation in which both drive trains of the first engine 10 would, through a malfunction, be operational simultaneously. Failure of the apparatus would immediately result. However, the location of the overrun mechanism 34 at the output side of the first clutch 32 insures against any such unintended interconnection. The purpose of the overrun mechanism 46 associated with the second clutch 42 is to permit the first engine 10 to drive the electric generator and the hydraulic pump 83 through the engine input shaft 40 and the second clutch hub 44. The second clutch 42 need not be engaged for this engine drive operation.

After the shift point has been reached and the shift has been accomplished, the first engine speed monitor 116 continues to sense the engine speed and, when about 60 percent of engine speed has been reached, the first shift control unit 118 causes disengagement of the second clutch 44 and simultaneously causes disengagement of the main clutch 18. In the event that any combination of these clutches 32 and 42, or even in the event that all clutches in the system were to fail to disengage, there is still protection against the engine 10 causing the auxiliary power unit 14 to over-speed by transmitting power back to that unit. If all clutches were engaged, the operation of the overrun mechanism 34 associated with the first clutch 32 and the operation of the overrun mechanism 20 associated with the main clutch 18 would prevent this occurrence. In fact, the overrunner 20 associated with the main clutch 18 would alone prevent the auxiliary power unit 14 from being driven.

Once the first engine 10 has been started, the second engine 12 can be started by first engaging the cross drive clutch 56. Although the auxiliary power unit 14 could be used to start the second engine 12, it is preferable to employ the first engine 10 to start the second engine. Power from the first engine 10 is supplied through the overrun mechanism 46 and the bevel gears 60 and 62 to the cross drive shaft 52, then to the input side of the fourth clutch 68 and to the input side of the third clutch 66. The third clutch 66 is then engaged to bring the second engine 12 up to the shift point, again in accordance with the graph of FIG. 6.

Engine speed is sensed by a second engine speed monitor 120 and an appropriate signal is supplied to a second shift control unit 122 to bring about disengagement of the third clutch 66 and engagement of the fourth clutch 68. Again the shift point occurs during the assist phase, after the ignition point has been reached. A similar arrangement of the overrun mechanism 94 associated with the second engine 12 insures against any damage to the starting power drive line or the auxiliary power unit 14. The overrun mechanism 94 permits the second engine 12 to drive the second generator 81 and pump 83 without driving through either the third or the fourth clutch 66 and 68.

The apparatus of FIG. 1 has the flexibility to alternatively start the second engine 12 first. This procedure might be preferred if, for example, difficulty were anticipated in starting the first engine 10 since the greater starting power of the second engine 12, as compared to that of the auxiliary power unit 14, would then be available to start the first engine.

To start the second engine 12 first, the first and second clutches 32 and 42 are both disengaged and the power of the auxiliary power unit 14 is supplied through the main clutch 18 to the first clutch drive gear 26, the input side 48 of the second clutch 42, and thence to the cross-drive clutch 56 and the cross-drive shaft 52.

It is essential that the first, second, third and fourth clutches 32, 42, 66 and 68 be of the type described with reference to FIGS. 2-5. It is preferable to use the same construction with respect to the main clutch 18 and the cross-drive clutch 56.

It will be appreciated from the foregoing that the present invention enables a jet engine to be started by a relatively small auxiliary power unit using a combination of gears and clutches without torque converters. Moreover, only a single shift is required with respect to each engine due to the combined effect of employing clutches having an unusual provision for the central distribution of cooling fluid and the selection of a shift point in the assist phase of the starting procedure. While this invention has been explained with reference to a two-engine aircraft, it can be applied as well to aircraft having a larger or smaller number of engines.

While a particular form of the invention has been illustrated and described, it will be apparent that various modifications can be made without departing from the spirit and scope of the invention.

I claim:

1. In an aircraft having a jet engine, an apparatus for starting said engine comprising:

a starting power source;

first gear train means for delivering rotational power from said starting power source to said jet engine at a first mechanical advantage;

second gear train means arranged in parallel with said first gear train means for delivering rotational power from said starting power source to said jet engine at a second mechanical advantage, said second mechanical advantage being lower than said first mechanical advantage;

first clutch means for selectively connecting said first gear train means to said jet engine;

second clutch means for selectively connecting said second gear train means to said jet engine, said first and second clutch means each including (a) a plurality of interfacing plates and discs arranged in a stack at least some of which are provided on their opposing surfaces with cooling fluid distribution grooves extending outwardly from the centers thereof, and (b) means for supplying cooling fluid to the centers of said discs and plates whereby said oil is caused to continuously migrate radially outwardly across said surfaces to provide a thin shear film of cooling fluid thereon;

overrun means for transmitting power from said jet engine through the input side of said second clutch means while by-passing the output side of said second clutch means; and shift means for sensing the speed of said jet engine and for disengaging said first clutch means and engaging said second clutch means at a predetermined engine speed above the ignition point of said jet engine that occurs during the assist phase of starting said engine.

2. In an aircraft having a jet engine, an apparatus for starting said engine comprising:

a starting power source;

first gear train means for delivering rotational power from said starting power source to said jet engine at a first mechanical advantage;

second gear train means arranged in parallel with said first gear train means for delivering rotational power from said starting power source to said jet engine at a second mechanical advantage, said second mechanical advantage being lower than said first mechanical advantage;

first clutch means for selectively connecting said first gear train means to said jet engine;

second clutch means for selectively connecting said second gear train means to said jet engine, said first and second clutch means each including (a) a plurality of interfacing plates and discs arranged in a stack at least some of which are provided on their opposing surfaces with cooling fluid distribution grooves extending outwardly from the centers thereof, and (b) means for supplying cooling fluid to the centers of said discs and plates whereby said oil is caused to continuously migrate radially outwardly across said surfaces to provide a thin shear film of cooling fluid thereon;

first overrun means associated with said first clutch means for transmitting power from said starting power source through said first clutch means to said jet engine and for preventing the transmission of power from said jet engine through said first clutch means to said starting power source or said second clutch means;

second overrun means associated with said second clutch means for transmitting power from said jet engine through the input side of said second clutch means while by-passing the output side of said second clutch means; and, shift means for sensing the speed of said jet engine and for disengaging said first clutch means and engaging said second clutch means at a predetermined engine speed above the ignition point of said jet engine that occurs during the assist phase of starting said engine.

3. The apparatus of claim 1 wherein said first overrun means is connected to the output side of said first clutch means.

4. In an aircraft having first and second jet engines, an apparatus for starting said engines comprising:

a starting power source;

a main clutch connected to said starting power supply;

first gear train means for delivering rotational power from said starting power source through said main clutch to said first jet engine at a first mechanical advantage;

second gear train means arranged in parallel to said first gear train means for delivering rotational power from said starting power source through said main clutch to said first jet engine at a second mechanical advantage, said second mechanical advantage being lower than said first mechanical advantage;

first clutch means for selectively connecting said first gear train to said first jet engine;

second clutch means for selectively connecting said second gear train means to said first jet engine;

first shift means for sensing the speed of said first jet engine and for disengaging said first clutch means and engaging said second clutch means at a predetermined engine speed above the ignition point of said first jet engine during the assist phase of starting said first jet engine;

third gear train means for delivering rotational power from a cross-drive means to said second jet engine at said first mechanical advantage;

third clutch means for selectively connecting said third gear train means to said second jet engine;

fourth gear train means for delivering rotational power from said cross-drive means to said second jet engine at said second mechanical advantage;

fourth clutch means for selectively connecting said fourth gear train means to said second jet engine, said first, second, third and fourth clutch means each including (a) a plurality of interfacing plates and discs arranged in a stack at least some of which are provided on their opposing surfaces with cooling fluid distribution grooves extending outwardly from the centers thereof, and (b) means for supplying cooling fluid to the centers of said plates and discs, whereby said cooling fluid is caused to continuously migrate radially outwardly across said surfaces to provide a thin shear film of cooling fluid;

second shift means for sensing the speed of said second jet engine and for disengaging said third clutch means and engaging said fourth clutch means at a predetermined engine speed above the ignition point of said second jet engine during the assist phase of starting said second jet engine; and, a plurality of overrun means for transmitting power from said starting power source to said jet engines and for preventing the transmission of power from said jet engines to said starting power supply, thereby protecting said starting power source from over-speeding, wherein one of said overrun means is connected to the output side of said first clutch means, one of said overrun means is connected to the input side of said second clutch means, one of said overrun means is connected to the output side of said third clutch means, and one of said overrun means is connected to the input side of said fourth clutch means.

* * * * *